US011717109B2

(12) United States Patent
Reales Bertomeo

(10) Patent No.: US 11,717,109 B2
(45) Date of Patent: Aug. 8, 2023

(54) DEVICE AND METHOD FOR THE AUTOMATED HEATING AND/OR COOKING OF FOOD

(71) Applicant: REAMOTION GMBH, Delmenhorst (DE)

(72) Inventor: Emilio Reales Bertomeo, Delmenhorst (DE)

(73) Assignee: REAMOTION GMBH, Delmenhorst (DE)

( * ) Notice: Subject to any disclaimer, the term of this patent is extended or adjusted under 35 U.S.C. 154(b) by 346 days.

(21) Appl. No.: 16/652,404

(22) PCT Filed: Sep. 28, 2018

(86) PCT No.: PCT/EP2018/076481
§ 371 (c)(1),
(2) Date: Jul. 16, 2020

(87) PCT Pub. No.: WO2019/063796
PCT Pub. Date: Apr. 4, 2019

(65) Prior Publication Data
US 2020/0345173 A1    Nov. 5, 2020

(30) Foreign Application Priority Data
Sep. 28, 2017    (DE) ...................... 20 2017 105 946.4

(51) Int. Cl.
*A47J 36/32*    (2006.01)
*A23L 5/10*    (2016.01)
(Continued)

(52) U.S. Cl.
CPC ................. *A47J 36/32* (2013.01); *A23L 5/15* (2016.08); *A47J 37/04* (2013.01); *F24C 15/32* (2013.01); *A23V 2002/00* (2013.01)

(58) Field of Classification Search
CPC ... A47J 36/32; A47J 37/04; A23L 5/15; F24C 15/32
See application file for complete search history.

(56) References Cited

U.S. PATENT DOCUMENTS 2,851,575 A * 9/1958 Walston ................. F24C 15/16
219/385
5,429,043 A    7/1995 Becker
(Continued)

FOREIGN PATENT DOCUMENTS

AT         606072 A    5/1976
DE      1 063 544 B    8/1959
(Continued)

OTHER PUBLICATIONS

Examination Report in European Patent Application No. 18782925.4 dated Sep. 13, 2022.

*Primary Examiner* — Steven N Leff
(74) *Attorney, Agent, or Firm* — BakerHostetler

(57) ABSTRACT

A device for heating and/or cooking food, in particular meat products, includes a cooking chamber formed in the housing for the food to be cooked, a heating device associated with the cooking chamber and having at least one heating element for heating the food product, and at least one food receptacle for receiving the food product in the cooking chamber. The food receptacle is movably received by an adjusting device for adjusting at least the distance of the food receptacle relative to the heating device.

17 Claims, 4 Drawing Sheets

(51) Int. Cl.
    *A47J 37/04*         (2006.01)
    *F24C 15/32*         (2006.01)

(56) References Cited

U.S. PATENT DOCUMENTS

| | | |
|---|---|---|
| 6,091,057 A | 7/2000 | Asami et al. |
| 8,141,479 B2 | 3/2012 | Ellersiek et al. |
| 8,372,459 B2 * | 2/2013 | Owensby ................ A23L 5/10 |
| | | 99/391 |
| 9,097,429 B2 | 8/2015 | Nam |
| 10,512,361 B2 | 12/2019 | To et al. |
| 10,524,615 B2 | 1/2020 | Reales Bertomeo et al. |
| 2005/0173421 A1 * | 8/2005 | Kim .................... H05B 6/6494 |
| | | 219/682 |
| 2012/0125312 A1 | 5/2012 | Nam |
| 2014/0131345 A1 * | 5/2014 | Watson ................ H05B 6/129 |
| | | 219/620 |

FOREIGN PATENT DOCUMENTS

| | | |
|---|---|---|
| DE | 69916175 T2 | 3/2005 |
| DE | 102004026882 A1 | 12/2005 |
| DE | 10 2007 038040 B3 | 7/2008 |
| DE | 20 2016 104922 U1 | 9/2016 |
| EP | 59147937 A | 8/1984 |
| EP | 1 532 908 A1 | 5/2005 |

\* cited by examiner

DEVICE AND METHOD FOR THE AUTOMATED HEATING AND/OR COOKING OF FOOD

CROSS-REFERENCE TO RELATED APPLICATIONS

This application is a National Stage of International Patent App. No. PCT/EP2018/076481, filed on Sep. 28, 2018, which claims priority to German Patent App. No. DE 20 2017 105 946.4, filed on Sep. 28, 2017, the disclosures of which are incorporated by reference in their entirety.

FIELD OF THE INVENTION

The invention relates to a device for automated heating and/or cooking of food, in particular meat products, comprising a housing, a cooking chamber for the food to be cooked, a heating device associated with the cooking chamber and having at least one heating element for heating the food product, and at least one food receptacle for receiving the food product in the cooking chamber. The invention also relates to a method for automated heating and/or cooking of food, in particular of meat products, by means of a cooking device.

BACKGROUND

Devices for heating and/or cooking food, which are used in catering to prepare foods such as sausages or French fries or meat products, are known from the prior art. Sausages and also French fries can be reliably prepared at an appropriately high level of quality due to their substantially similar size and their uniform structure.

Such a device for heating and/or cooking, having a housing with a cooking chamber and an opening in the housing for inserting a food receptacle into the cooking chamber, is known from DE 20 2014 005 299. The food receptacles, which may be designed as insertion cartridges or as drums, are each inserted into and removed from the cooking chamber by hand.

However, it is more difficult to prepare larger food portions, in particular pieces of meat, for example of beef, which are more complicated to prepare, depending on the structure of the piece of meat. Cooking times may vary greatly depending, in particular, on the amount of muscle tissue in the piece of meat. Preparing such foods whilst ensuring uniform quality can only be guaranteed to a limited extent, particularly when the individually desired "doneness", such as "rare", "medium" or "well-done", is taken into account. It is also necessary that the responsible person continuously monitors the cooking operation so that the desired result can be achieved and that the food is not inadvertently overcooked or suffers a serious deterioration in quality, with the result that the product can no longer be consumed.

SUMMARY OF THE INVENTION

The object of the invention is to specify a device and a method with which even large pieces of meat can be reliably prepared in good quality.

In a first aspect, the invention achieves its object with a device for heating and/or cooking food in accordance with the features of claim 1. The food receptacle is movably received by means of an adjusting device for adjusting at least the distance of the food receptacle relative to the heating device. With the aid of the adjusting device, the food receptacle can be moved relative to the heating device inside the cooking chamber. This allows the effect of the heat generated in the cooking chamber by the heating device on the food in the food receptacle to be controlled in a targeted manner. The adjusting device is preferably configured and coupled with the food receptacle in such a way that the food receptacle performs a translational movement inside the cooking chamber.

According to a preferred embodiment of the invention, the adjusting device has a lifting device for vertically adjusting the food receptacle inside the cooking chamber. The heating device is preferably arranged at the top side of the cooking chamber. In one embodiment of the invention, the heating device is configured to generate temperatures ranging from 650° C.-800° C. for preparation of the food. By means of the lifting device, the food can be brought within range of the heating device by moving the food receptacles upwards. By moving the food receptacle by means of the lifting device in the opposite direction, i.e., downwards towards the floor of the cooking chamber, the food receptacle and thus the food inside it is taken out of range of the heating device. A uniform heating effect is preferably applied to the top side of the food receptacle by the heating device arranged at the top of the cooking chamber.

In one development of the invention, the adjusting device additionally has a rotating means for turning the food receptacle inside the cooking chamber. Providing a rotating means preferably allows the food receptacle to be turned inside the cooking chamber. As a consequence, it is possible for a heating effect to be also applied to the side of the food receptacle that initially faces away from the heating device. A piece of meat accommodated in the food receptacle can thus be heated and cooked evenly from at least two opposite sides. Preparing such pieces of meat reliably with uniform quality is made easier as a result. This means it is no longer necessary to turn the food in the food receptacle by hand, and thus to interrupt the cooking process unnecessarily.

In one embodiment of the invention, the food receptacle is a flat surface element on which the food product to be prepared is held in place by appropriate holders. The holders are configured to secure the position of the food product relative to the food receptacle when turning the food receptacle.

The adjusting device preferably has one or more motoric drive means for adjusting the food receptacle in the cooking chamber and thus relative to the heating device. The motoric drive means allows automated preparation of the food product to be cooked. In particular, the motoric drive means allows actuation of the adjusting device for the food receptacle to be timed exactly. The food receptacle can preferably be rotated at a distance relative to the heating device and/or inside the cooking chamber with exact timing and positioning and without external intervention. In one embodiment of the invention, the rotating means is configured to impart an oscillating movement to the food receptacle inside the cooking chamber. The drive means for the adjusting device is provided, for example, in the form of electric motors which can be coupled, if necessary, via respective transmission gears with the mechanical components of the adjusting device and/or to implement the respective linear movement or rotating movement.

According to a preferred embodiment of the invention, the food receptacle has a receiving chamber for the food product and a thermally transmissible wall defining said receiving chamber. The food product to be prepared is preferably surrounded completely by the food receptacle.

The thermally transmissible wall produces a reliable heating effect on the food. In one embodiment of the invention, the food receptacle is designed as a kind of cage made of rod members spaced apart from each other. The spaces between the rod members are selected with such a size that the food product to be prepared cannot move out of the interior of food receptacle. The food receptacle is preferably in the shape of a hollow cuboid with walls substantially at right angles to each other. The food receptacle is fixed inside the cooking chamber or can be removed from it.

The food receptacle preferably has an opening for introducing and removing the food product into and from the receiving chamber, and a lid that can close said opening and forms regions of the wall. By means of the lid, which may preferably be arranged on the top side or underside of the food receptacle, the food product can be placed inside the food receptacle and removed from it after it has been prepared. The lid is mounted hingedly or pivotably on adjacent wall regions of the food receptacle. The lid preferably includes a locking means with which the lid is kept in its closed position on an adjacent wall region of the food receptacle.

Another aspect of the invention, for which separate protection is claimed and which also forms an advantageous development of the subject-matter according to claim 1 when combined with the aforementioned subject-matter, relates to a device in which at least one movably mounted shielding element for shielding the cooked food product from the heating device is provided in the cooking chamber. When preparation of the food in the cooking chamber has been completed, it is proposed, in particular, that the food product be removed from the direct influence of the heating device. Inadvertent further cooking of the food to be prepared is thus prevented. A shielding element which can be placed between the heating device and the food receptacle is preferably arranged in the cooking chamber. The shielding element is preferably designed to reflect the radiated heat produced by the heating device in the direction of the heating device. The shielding element is also designed to form a resting zone for the prepared food product inside the cooking chamber. The shielding element is preferably designed such that a temperature of approximately 56° C. arises on the side of the shielding element where the food product is located. This not only prevents inadvertent cooling of the food product, but also prevents the cooking process from continuing in the finished food product.

According to a preferred development of the invention, two shielding elements are provided on opposite sides of the cooking chamber, which are pivotably mounted as flap portions on a respectively associated wall region of the cooking chamber and which are designed to divide the cooking chamber into two substantially separated regions. In one embodiment of the invention, the shielding elements form a partition inside the cooking chamber. A post-cooking chamber is preferably separated from the cooking chamber in this way. In those cases where the food product to be prepared may not be removed immediately from the cooking chamber after cooking has finished, it is possible to keep the food product for a specific period of time in the post-cooking chamber after it has been cooked. Temperature measurement by means of a temperature sensing device is preferably provided inside the post-cooking chamber so that the temperature in the post-cooking chamber can be measured.

According to one embodiment of the invention, each of the shielding elements can be moved by means of a drive means from a substantially vertical position preferably near a lateral wall region of the cooking chamber into a substantially horizontal orientation. In conjunction with a heating device arranged at the top side of the cooking chamber, the shielding elements are oriented so that they run parallel to the side walls of the cooking chamber. The shielding elements in the form of flap portions thus extend parallel to the side walls of the cooking chamber while the food is being prepared. When preparation of the food has been completed, the food receptacle is moved away from the heating device. In particular, the food receptacle is moved by means of the lifting device of the adjusting device to a position above the floor of the cooking chamber. After the food receptacle has reached its lower position in the cooking chamber, the shielding elements pivot preferably successively into their horizontal orientation in the cooking chamber. Two regions separated from each other and arranged one above the other are then provided inside the cooking chamber. The shielding elements are moved from their vertical position into their horizontal orientation by means of a suitable adjusting unit, such as a pivot drive, for example. In the region of the side walls of the cooking chamber, the shielding elements are received via pivot bearings with pivot axes running horizontally and substantially parallel to the side walls.

In another preferred embodiment of the invention, or according to a further aspect of the invention, the device is characterized by a sensor device having at least one sensor for sensing a property of the food product and which can be moved relative to the food product in the cooking chamber by means of a drive and guide means. By means of the sensor device, it is possible to sense a property of the food product and to state its degree of doneness. The sensors of the sensor device are moved by the drive and guide means in such a way that the sensors come into contact with at least the surface of the food product in the food receptacle. The food receptacle preferably has at least one opening through which the sensor to be brought into contact with the food product being prepared can be guided. The sensors of the sensor device are movably mounted inside the cooking chamber by means of the drive and guide means.

According to a preferred embodiment of the invention, the sensor device is provided in the form of a temperature sensing device comprising at least one temperature sensor for sensing the temperature of the food product, and the sensor or sensors preferably has/have a measuring tip which can be inserted into the food product to measure the core temperature of the food product. The sensor thus senses at least the temperature at the surface of the food product to be prepared. Preferably, the sensors are not only brought into contact with the surface of the food product, but penetrate a predetermined amount into the food product to be prepared. This allows more accurate information to be given about the actual degree of doneness of the food product to be prepared. The sensor or sensors are provided in the form of resistance thermometers, for example. The sensors are preferably connected electrically conductively with the sensing device.

In another embodiment, the sensor or sensors are movably arranged in a wall region bounding the cooking chamber. To measure the temperature at the surface of the food product, for example, or to measure the core temperature of the food product, the sensors are preferably moved from a position close to a wall region of the cooking chamber to a position in which the sensors project into the cooking chamber. Particularly when moving or adjusting the food receptacle, the sensors are moved out of the range of movement of the food receptacle. In one embodiment of the inventive, the sensors of the sensor device can only be moved when the food receptacle has adopted a specific position inside the cooking chamber of the device according to the invention.

According to a preferred development of the invention, the sensors can be moved between a resting position arranged inside a respective wall region and a measuring position projecting from the respective wall regions. In their resting position, the temperature sensors are preferably arranged in the wall region of the cooking chamber in such a way that they are fully recessed into the side wall. In their measuring position, the temperature sensors preferably project substantially perpendicularly from a side wall of the cooking chamber. The temperature sensor or temperature sensors penetrate the food product preferably via a peripheral surface of the food product approximately parallel to the cooking surface.

In another embodiment of the invention, there is a controller for controlling or actuating at least the adjusting device that moves the food receptacle, and/or the movable shielding element and/or the temperature sensor that is forcibly moved. The controller can control the various components of the inventive device in a targeted manner. In that way, it is possible to implement an operating cycle on the device that allows automated heating and/or cooking of food in the form of pieces of meat. Heating or cooking can thus be carried out in a reliable manner regardless of the size, mass or individual structure of the piece of meat, also taking individual wishes regarding the degree of doneness into consideration.

The controller comprises at least one programmable chip on which the different operating cycles can be stored in the form of a program. In one preferred embodiment, the heating device for producing the heat needed to cook the food product is also operated with the aid of the controller. In cases where the food product is found to be insufficiently cooked, it is possible by means of the controller to initiate a re-start of the cooking process in the cooking chamber, without having to remove the food product unnecessarily from the food receptacle beforehand.

The controller preferably has at least one control panel for manually setting a pre-selectable operating cycle of the device, and/or a display for displaying information. With the aid of the control panel, a desired operating cycle can be set on the device. Depending, in particular, on the desired degree of doneness of the food to be prepared, the temperature produced in the cooking chamber by means of the heating device, and the respective cooking times, can be adjusted and/or coordinated, for example, by pressing the relevant buttons. The display provided on the device according to the invention is used to display information such as the temperature in the cooking chamber, or the remaining cooking time for the food product. In one embodiment of the invention, the device has a combined control panel and display for displaying information. A touch-sensitive display is preferably used, on which information can be displayed and parameters can be adjusted.

In another development of the device according to the invention, an air routing device comprising at least one fan for generating a flow of air in at least one region of the cooking chamber is provided. By means of the air routing device, it is possible at least to circulate warm air inside the cooking chamber. Preferably after finishing the preparation process, and after the prepared food product has been sealed off in the post-cooking chamber from the heating device, the temperature inside the post-cooking chamber can be kept constant preferably by using the air routing device. The temperature in the post-cooking chamber is preferably kept in the region of about 56°C. This prevents the cooking process from continuing inadvertently, or a food product from cooling down inadvertently.

The fan is preferably allocated to the lower region of the cooking chamber and thus to the partitionable post-cooking chamber for the food product. The air routing device with its fan is configured to blow warm and/or cold air into the post-cooking chamber, depending on the temperature measured inside the post-cooking chamber.

The air routing device preferably has at least one duct preferably arranged outside the cooking chamber for routing the flow of air into specific regions of the cooking chamber. The duct can be coupled media-conductingly with, and decoupled from, the cooking chamber via predetermined control elements, such as a flap member. In one embodiment, the ventilator for producing the flow of air is arranged inside the duct. The duct arranged outside the cooking chamber for guiding the flow of air is arranged inside the housing of the device according to the invention.

The housing preferably includes an intake and removal opening as access to the cooking chamber and which can be opened and closed by means of a flap mounted on the housing. The cooking chamber can be opened and closed accordingly with the aid of the flap. The heat is kept inside the cooking chamber by means of the closable flap, particularly while heating and/or cooking the food. The flap, and the regions on the housing corresponding to the flap, preferably have a sealing element for sealable closure between the contacting parts of the flap and the housing. In one preferred embodiment, the flap is hingedly and movably connected at its lower end to the housing. The flap, which is vertically oriented in the closed state, is preferably mounted movably about a horizontally oriented pivot axis.

In a preferred embodiment of the invention, there is an exhaust air duct which can be coupled media-conductingly with the cooking chamber, and an exhaust air cleaning device preferably arranged in the exhaust air duct. In addition to the duct for guiding a flow of air, there is an exhaust air duct that can be coupled with the cooking chamber and with which vapors produced during the cooking process can be extracted in the form of exhaust air from the cooking chamber after the food product has been prepared. An exhaust air cleaning device comprising various components, such as a plasma chamber or an exhaust air filter, is arranged inside the exhaust air duct. An activated carbon filter is preferably used as the filter. In another embodiment of the invention, scented pads with which scents can be added to the exhaust air may be associated with the filter.

According to a further aspect, the invention relates to a method for automated heating and/or cooking of food, in particular of meat products, using a cooking device comprising a housing, a cooking chamber, a food receptacle and a heating device, in particular a device according to any one of the preferred embodiments described in the foregoing.

The method according to the invention achieves the initially described object with the steps: heating a food product received in a food receptacle from a first side by means of the heating device in the cooking chamber; removing the food receptacle from the heating device by means of an adjusting device; turning the food receptacle by means of the adjusting device, preferably substantially by 180°, so that the food product faces the heating device with a second side; moving the food receptacle closer to the heating device by means of the adjusting device; and heating the second side of the food product received in the food receptacle. The invention is based on the realization that that even large portions of food, such as pieces of meat, in particular, can be heated and/or cooked in an automated preparation process, in a reliable manner and in compliance with desired quality requirements, by applying the steps according to the invention. With the method according to the invention, an automated cooking process can be implemented, in which individually selected degrees of doneness of the food product to be prepared can be taken into consideration. Pieces of meat made from beef, for example, can be reliably prepared also according to the actual structure of the piece of meat to be prepared. The food product is preferably moved inside the cooking chamber by means of the adjusting device. In this way, it is optimally positioned in each case relative to the heating device, with the result that the food product is cooked reliably and above all evenly. To implement the automated cooking process, the food product is moved both translationally and rotationally inside the cooking chamber. Turning the food product by rotating the food receptacle is necessary in order to bring both sides of the food product within range of the heating device. By means of the steps according to the invention, it is possible to accurately control how the food product is moved relative to the heating device, and also the length of time to which it is exposed to heat. The entire method can thus be carried out without any further intervention by a person.

According to one preferred variant, the method according to the invention includes one, more or all of the following steps: sensing a property, in particular the temperature of the food in the food receptacle, by means of a sensing device, in particular a temperature sensing device; post-treating, in particular post-warming the food product and/or moving the food receptacle toward a region in the cooking chamber away from the heating device, depending on the sensed property, in particular the temperature of the food product; and shielding the prepared food product from the heating device, preferably by means of at least one shielding element. By sensing at least one property of the food product to be prepared, for example its temperature, preparation is subject to a kind of monitoring or control which allows conclusions to be drawn about the momentary degree of doneness of the food. Shielding the prepared food product from the heating device prevents the finished food product from continuing to cook inadvertently.

The preferred embodiments and developments described for the device according to the invention are also and simultaneously preferred embodiments of the method according to the invention for heating and/or cooking food.

BRIEF DESCRIPTION OF THE DRAWINGS

The invention shall now be described in greater detail with reference to a preferred embodiment and the attached Figures, in which.

DETAILED DESCRIPTION

Figure 1:
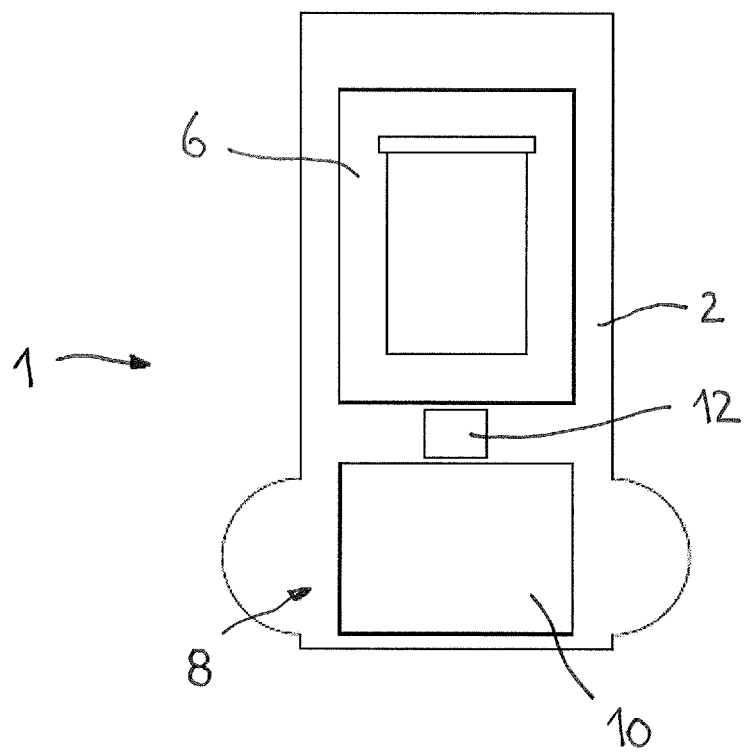
FIG. 1: shows a view of the device according to the invention.
Figure 2:
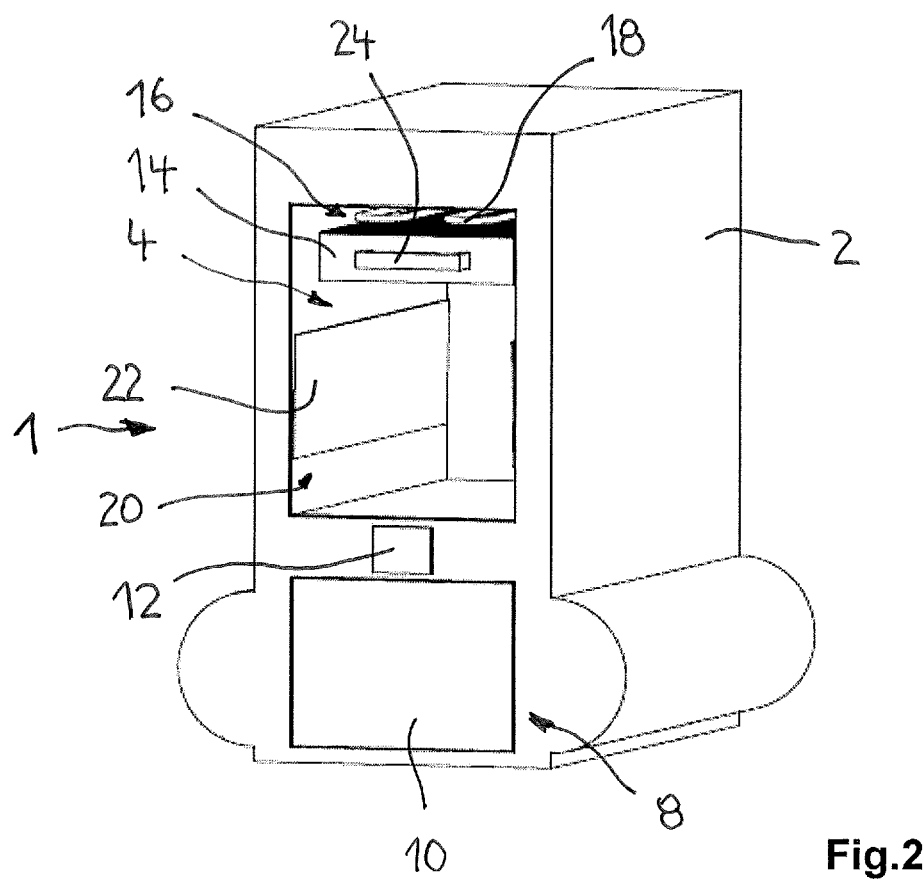
FIG. 2 shows a perspective view of the device in FIG. 1, with the cooking chamber open.

FIGS. 1 and 2 show a device 1 for heating and/or cooking food. Device 1 comprises a housing 2 with a cooking chamber 4 (FIG. 2) that can be accessed via a flap 6 that can be opened and closed.

Device 1 further comprises a cooling device 8 with a cooling box 10 that can be pulled out of and pushed into housing 2. The foods to be prepared by means of device 1 can be kept in cooling box 10. Housing 2 further comprises a display 12, which is a touch-sensitive display in the embodiment shown. Display 12 is thus used as an operating panel and for displaying information.

In FIG. 2, device 1 is shown with flap 6 removed. Inside cooking chamber 4, a food receptacle 14 is arranged underneath a heating device 16 having at least one heating element 18. Food receptacle 14 is movably received inside cooking chamber 4 relative to the heating device by means of an adjusting device which is not shown in further detail. Food receptacle 14 is securely integrated in cooking chamber 2, i.e., it cannot be removed. In another embodiment, food receptacle 14 is designed to be removable from the cooking chamber.

Shielding elements 22, 22' are arranged on side walls 20, 20'. The shielding elements are mounted pivotably about a horizontal axis on side walls 20, 20'. By means of the pivotable shielding elements 22, 22', a post-cooking chamber 36 (FIG. 8) can be separated from cooking chamber 2. Device 1 further comprises a power supply, not shown in further detail, for operating cooling device 8 and heating device 16. Food receptacle 14 includes a handle 24. In the embodiment shown, food receptacle 14 is so designed that it can be removed from cooking chamber 4.

FIGS. 3-8, described below, disclose a method according to the invention for heating and/or cooking food.

Figure 3:
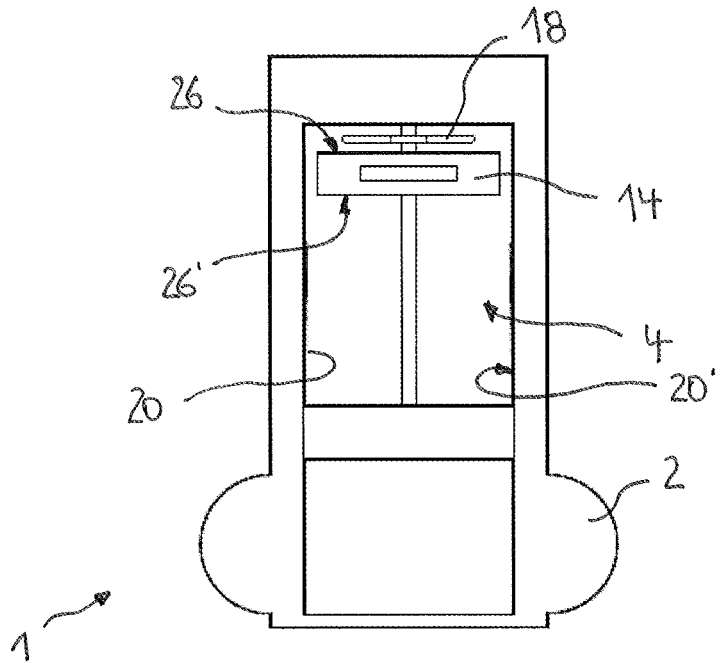
FIGS. 3-8: show views of a food cooking operation that can be implemented by means of the device.
Figure 4:
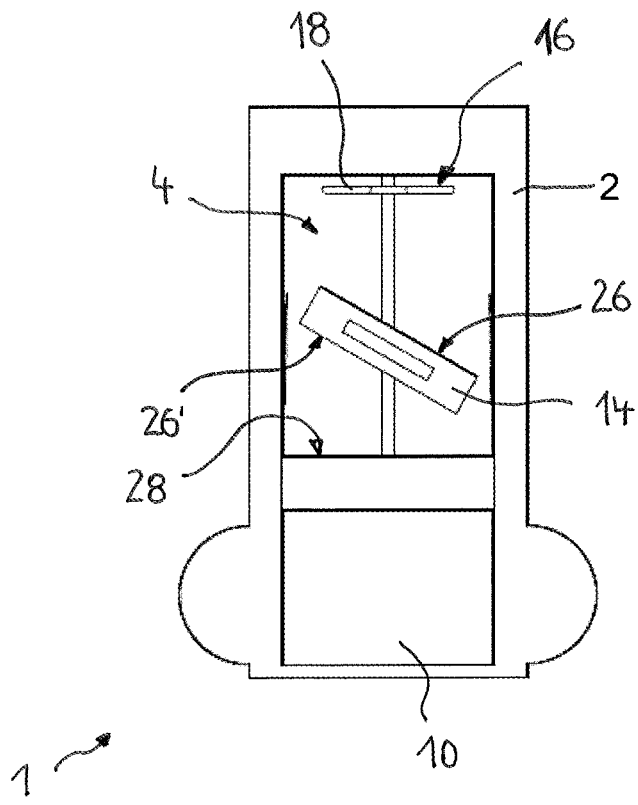
Figure 5:
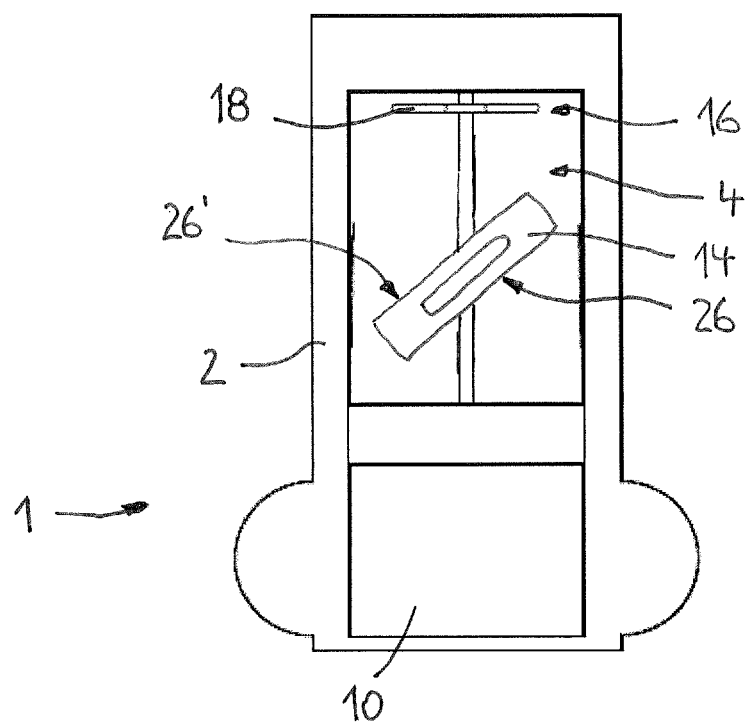

FIG. 3 shows a first step of the method, in which a food is accommodated in food receptacle 14. Food receptacle 14 is oriented with its top side 26 facing toward heating element 18 of heating device 16. The underside 26' faces the floor 28 of cooking chamber 4. Food receptacle 14 remains for a particular duration in the position shown in FIG. 3 directly below the heating element being operated. The food product accommodated in food receptacle 14 is thus exposed to the effects of heating device 16. After this preset duration has elapsed, food receptacle 14 is moved downwards by means of an adjusting device, not shown in further detail, from the position underneath heating element 18 in the direction of the floor 28 of cooking chamber 4 (FIG. 4). The adjusting device includes a lifting device, not shown in further detail, for moving food receptacle 14 up and down, and a rotating means. By means of the rotating means, food receptacle 14 is turned to such an extent that it is rotated by preferably 180°, as further illustrated in FIGS. 4 and 5.

Figure 6:
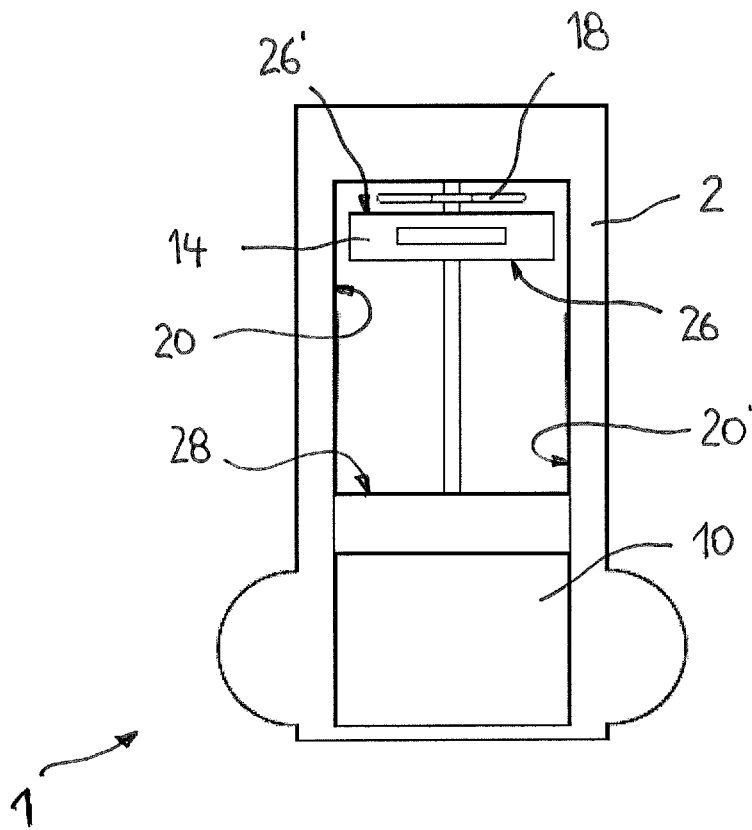

What used to be underside 26' now faces upwards and now faces heating device 16. As shown by FIG. 6, food receptacle 14 is moved by the lifting device of the adjusting device until it is directly underneath heating element 18 of heating device 16. The second, as yet uncooked side of the food product is now exposed to the heating effect of heating device 16. The second side of the food product is also kept for a specific period of time in the position shown in FIG. 6.

Figure 7:
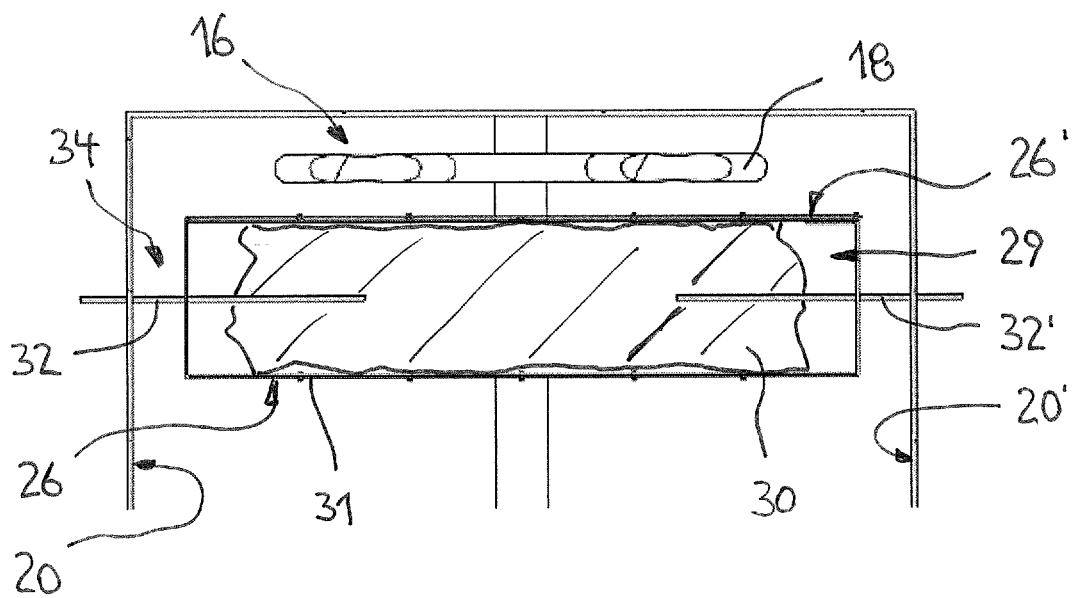

After the food product has been completely cooked, a property of the food product 30 accommodated in the food receptacle is sensed in a further step of the method, as shown by FIG. 7. In particular, the core temperature of food product 30, which has now been cooked from both sides, is sensed and measured. Based on the measured cooking temperature, it is determined whether food product 30 has reached the desired degree of doneness or needs to continue cooking. To continue cooking, food receptacle 14 would then have to be exposed again temporarily to the heating effect of heating device 16, on both the top side 26 (which is still facing down) and the underside 26'.

The core temperature of food product 30 is sensed with the aid of sensors 32, 32' of a sensor device 34. In order to sense the properties of the food product, sensors 32, 32' are extended through side walls 20, 20' of cooking chamber 4 and into food receptacle 14. Sensors 32, 32' are movably positioned relative to food product 30 by means of a drive and guide means.

Figure 8:
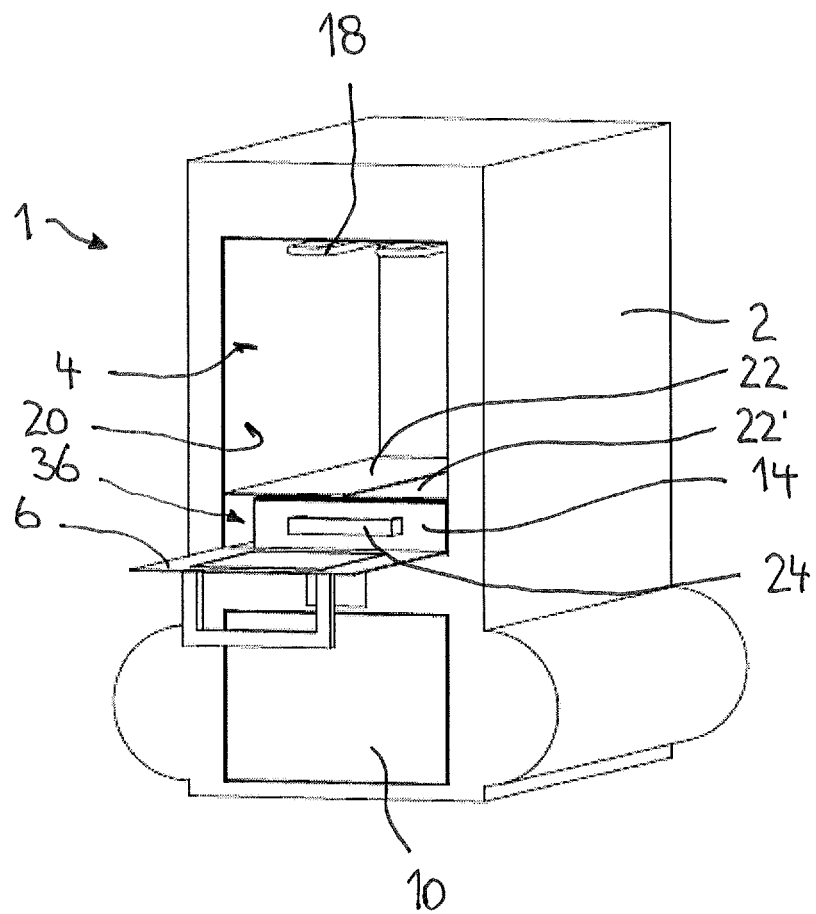

FIG. 8 shows the end of the preparation process, where food receptacle 14 has been moved into its lowermost position close to the floor 28 of cooking chamber 4. The top side 26 is shielded by means of shielding elements 22, 22' from heating device 16. This prevents the temperature having any further effect on the food in the post-cooking chamber 36 thus formed. The fully prepared food 30 keeps its finished state without further change, the temperature in post-cooking chamber 36 being kept in the region of about 56° C. In order to form post-cooking chamber 36, shielding elements 22, 22' as moved from their vertical positions at the side walls 20, 20' of cooking chamber 4 (FIG. 2) into the substantially horizontal orientation shown here. In the embodiment shown, shielding elements 22, 22' overlap each other in their horizontal orientation.

List of reference signs:

1 Device
2 Housing
4 Cooking chamber
6 Flap
8 Cooling device
10 Cooling box
12 Display
14 Food receptacle
16 Heating device
18 Heating element
20, 20' Side wall
22, 22' Shielding element
24 Handle
26 Top side
26' Underside
28 Floor
30 Food product
32, 32' Sensor
34 Sensor device
36 Post-cooking chamber

The invention claimed is:

1. A device for heating and/or cooking food, the device comprising:
 a housing;
 a cooking chamber formed in the housing;
 a heating device arranged at a top side of the cooking chamber and having at least one heating element for heating the food;
 at least one food receptacle for receiving the food in the cooking chamber;
 an adjusting device for adjusting a distance of the food receptacle relative to the heating device from an upper position beneath the heating device to a lowered position close to a floor of the cooking chamber;
 wherein the adjusting device additionally comprises a rotator for turning the food receptacle inside the cooking chamber,
 at least one movably mounted shielding element for shielding cooked food at a top side from the heating device provided in the cooking chamber, when the at least one food receptacle has been moved into the lowered position by the adjusting device, and
 wherein the at least one movably mounted shielding element is pivotably mounted about a horizontal axis on a side wall of the cooking chamber and is movable from a vertical position into a horizontal orientation.

2. The device of claim 1, wherein the adjusting device comprises a lifting device for vertically adjusting the food receptacle inside the cooking chamber.

3. The device of claim 1, wherein the adjusting device comprises one or more motors for adjusting the distance of the food receptacle relative to the heating device.

4. The device of claim 1, wherein the food receptacle comprises a thermally transmissible wall defining a receiving chamber for the food.

5. The device of claim 4, wherein the food receptacle has an opening for introducing and removing the food into and from the receiving chamber, and a lid that can close said opening.

6. The device of claim 5, wherein the at least one movably mounted shielding element comprises two shielding elements provided on opposite sides of the cooking chamber, the two shielding elements dividing the cooking chamber into two substantially separated regions.

7. The device of claim 6, wherein each of the two shielding elements is movable from a substantially vertical position to a substantially horizontal orientation.

8. The device of claim 1, further comprising at least one sensor for sensing a property of the food, the sensor being configured to move relative to the food in the cooking chamber using a drive and guide.

9. The device of claim 8, wherein the sensor is at least one temperature sensor for sensing a temperature of the food.

10. The device of claim 8, wherein the sensor is movably arranged in a wall region bounding the cooking chamber.

11. The device of claim 8, wherein the sensor is configured to be moved between a resting position arranged inside a wall region and a measuring position projecting from the wall region.

12. The device of claim 1, further comprising a controller for actuating at least the adjusting device or the heating device.

13. The device of claim 12, wherein the controller comprises:
 at least one control panel for receiving an operating cycle of the device, and/or a display for displaying information.

14. The device of claim 1, further comprising an air routing device comprising at least one fan for generating a flow of air within the cooking chamber.

15. The device of claim 14, wherein the air routing device has at least one duct outside the cooking chamber for routing the flow of air into the cooking chamber.

16. The device of claim 1, wherein the housing includes an intake and removal opening as access to the cooking chamber.

17. The device of claim 1, further comprising an exhaust air duct in fluid communication with the cooking chamber.

* * * * *